United States Patent
Sahinoglu et al.

(10) Patent No.: US 7,099,277 B2
(45) Date of Patent: Aug. 29, 2006

(54) DYNAMIC OPTIMAL PATH SELECTION IN MULTIPLE COMMUNICATIONS NETWORKS

(75) Inventors: Zafer Sahinoglu, Clifton, NJ (US); Anthony Vetro, Short Hills, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 955 days.

(21) Appl. No.: 10/079,096

(22) Filed: Feb. 20, 2002

(65) Prior Publication Data

US 2003/0156543 A1  Aug. 21, 2003

(51) Int. Cl.
H04L 12/26  (2006.01)
H04L 12/28  (2006.01)

(52) U.S. Cl. .................................... 370/238; 370/255
(58) Field of Classification Search ............... None
See application file for complete search history.

(56) References Cited

U.S. PATENT DOCUMENTS

| | | | |
|---|---|---|---|
| 5,828,655 A | 10/1998 | Moura | 370/236 |
| 5,970,050 A * | 10/1999 | Johnson | 370/238 |
| 5,995,807 A | 11/1999 | Magnier | 370/238 |
| 6,104,701 A | 8/2000 | Avargues | 370/238 |
| 6,163,526 A | 12/2000 | Egoshi | 370/228 |
| 6,278,878 B1 | 8/2001 | Noda | 455/436 |
| 6,301,244 B1 | 10/2001 | Huang | 370/351 |
| 6,310,883 B1 * | 10/2001 | Mann et al. | 370/408 |
| 6,327,245 B1 | 12/2001 | Satyanarayana | 370/229 |
| 6,343,122 B1 | 1/2002 | Andersson | 379/219 |
| 6,618,371 B1 * | 9/2003 | Cao | 370/388 |
| 6,778,502 B1 * | 8/2004 | Ricciulli | 370/238 |
| 6,925,061 B1 * | 8/2005 | Lee et al. | 370/238 |
| 2003/0088671 A1 * | 5/2003 | Klinker et al. | 709/225 |

* cited by examiner

Primary Examiner—Steven Nguyen
Assistant Examiner—Clemence Han
(74) Attorney, Agent, or Firm—Dirk Brinkman; Andrew J. Curtin (57) ABSTRACT

A method and system connects a first terminal via multiple networks to a second terminal. An environment description is acquired and parsed by a description parser into cost parameters using a set of rules. An objective function evaluates the cost parameters to determine an optimal path to connect the first terminal to the second terminal through the multiple networks using a switch. The selection of the optimal path can be done periodically during a particular application session.

28 Claims, 10 Drawing Sheets

| Networks | Link Capacity | Link Utilization | Connection Cost |
|---|---|---|---|
| ADSL (1) | 1.5M/128Kbps | 0.56 | $/month |
| SDSL | 1.5M/1.5Mbps | 0.43 | $/month |
| T1 | 1.54M/1.54Mbps | 0.78 | $/month |
| GSM (Cellular N.) | 9.6Kbps | 0.00 | $/min (time variant) |
| Cable | 10Mbps | 0.52 | $/month |

DYNAMIC OPTIMAL PATH SELECTION IN MULTIPLE COMMUNICATIONS NETWORKS

RELATED APPLICATION

This application is related to U.S. patent application Ser. No. 10/078,960, filed herewith, and incorporated herein by reference.

FIELD OF THE INVENTION

This invention relates generally to communications systems with multiple networks and terminals that can connect to any one of the networks, and in particular to a method and system for dynamically selecting and accessing multiple networks optimally.

BACKGROUND OF THE INVENTION

Figure 1:
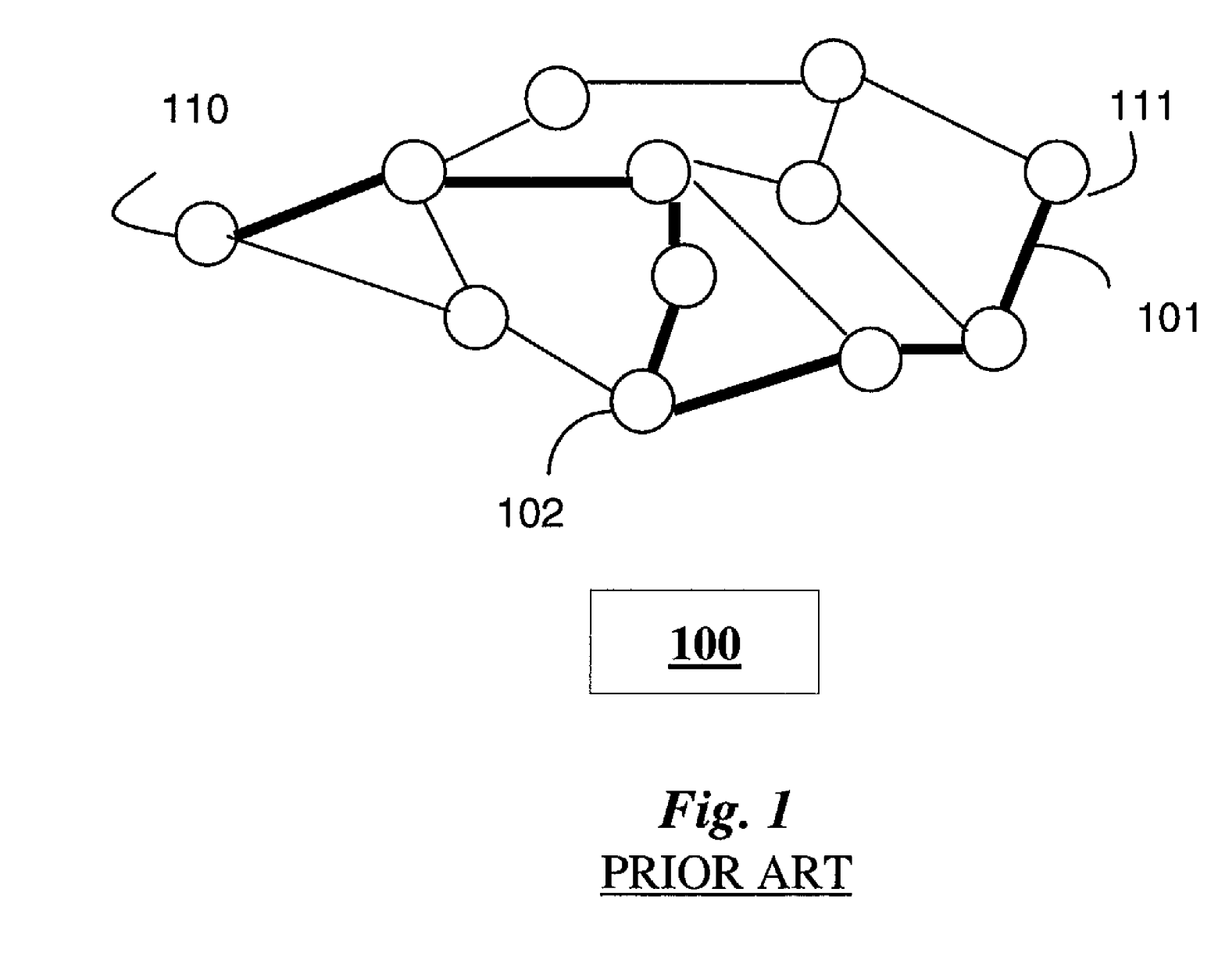
FIG. 1 is a diagram of a single network with static path selection according to the prior art.

As shown in FIG. 1, for a communications network 100, a path is defined as all physical links 101 and nodes 102 that connect two terminals 110–111. The nodes can be routers, bridges, gateways, and the like The transmission medium of the communication network 100 can be, for example, cable, fiber, wired, wireless, satellite, and the like. The terminals 110–111 can be any type of device capable of transmitting or receiving data via the network 100. For example, in a cable network, the terminal 110 can be a content or Web server, and the terminal 111 can be a television connected to the network via a set-top box. In a wireless network, the terminals can be telephones, computers, PDA's, etc. Depending on the application, a terminal, at any one time, can be source or a destination for communicated signals, or both.

The conventional approach for selecting a path first selects a network, and then selects a path in the selected network on the basis of some desired cost or "objective." The objective can be attained by evaluating some predetermined objective function. The objective function can consider multiple factors, such as, monetary cost, bandwidth, capacity, link utilization, quality of serve (QoS), and the like. Some factors may be minimized, while others are maximized. For example, some users want to maximize bandwidth and QoS, no matter what the cost, while others may be interested in minimizing cost, even if performance is degraded.

In any case, the objective function is evaluated once, and an optimal path that best satisfies the objective function is selected, and a connection is established. The selected network and path are then used for all access by the terminals for the lifetime of the connection, i.e., a session providing data access services. In FIG. 1, this path is shown bolded. In other words, the selection of the path is static and for a single network.

A variety of methods for selecting the optimal path are known, see for example, R. Bhandri, "Algorithms for Diverse Routing," Kluwer Academic Publishers, 1999, D. Bertsakas, "Linear Network Optimization: The Algorithm and the Codes," MIT press, 1991, U.S. Pat. No. 6,301,244, "QoS-oriented one-to-all route selection method for communication networks," issued to Huang, et al. on Oct. 9, 2001, and U.S. Pat. No. 6,104,701, "Method and system for performing a least cost routing function for data communications between end users in a multi-network environment," issued to Avargues, et al. on Aug. 15, 2000.

Among the most popular methods are the well-known Dijkstra algorithm, the breath-first-search (BPF) shortest path algorithm, and the Belman-Ford algorithm. These methods basically operate on the same principle. The selection of the optimal path is based on the combined costs of the individual links that form the path.

For instance, the Dijkstra's algorithm models the objective function as a graph with weighted links. Given a root vertex as its input, the function returns, as its output, a label for each vertex on the graph. In the case where the weights represent the length of the links, each vertex label represents the length of the shortest path from the root vertex to a particular vertex. Thus, the algorithm finds the shortest path for traveling from a given vertex on a graph to every other vertex.

U.S. Pat. No. 6,343,122, "Method and apparatus for routing traffic in a circuit-switched network," issued to Andersson on Jan. and an apparatus for routing traffic in a circuit switched network. This patent relates to traffic switching in a single telecommunications network including a plurality of routes between a call originating and destination terminals with no concern of time variant cost parameters, but not to that in a system with multiple networks with the concern of time variant objectives for use in communication switching. The method includes offering a call between an origin node and a destination node to a preferred route between the nodes, and if the preferred route is not available, offering an alternative route via an intermediate node, and for links between two nodes, setting a first trunk reservation threshold for reserving a certain number of circuits for direct calls along the links between the two nodes, and setting a second trunk reservation threshold for calls between nodes connecting a second link of the alternative route.

U.S. Pat. No. 6,327,245, "Automatic channel switching for jamming avoidance in burst-mode packet data wireless communication networks," issued to Satyanarayana, et al. on Dec. 4, 2001, relates to the field of wireless networks in which a large number of nodes communicate with a central computer. The invention relates more particularly to avoiding jamming in such a system. The invention uses a single channel of communication.

U.S. Pat. No. 6,278,878, "Mobile communications system with portable terminal for facilitating channel switching," issued to Noda on Aug. 21, 2001, describes a mobile communications system. A portable terminal can be used continuously in the mobile system without substantially terminating a communication session even when the communication with the mobile terminal is transferred from one base station to another as the terminal moves around.

U.S. Pat. No. 6,163,526, "Transmission system for switching connection from a working channel line to a protection channel line while avoiding instantaneous cutoff upon failure," issued to Egoshi on Dec. 19, 2000, relates to a transmission system with multiple terminals linked by a working channel line and a protection channel line in a redundant structure wherein a connection is switched from the working channel line to the protection channel line while avoiding instantaneous cut off when the working channel line has failed. That system does not consider the possibility that even if there is no failure, it may be desired to switch from a working channel to the protection channel.

U.S. Pat. No. 5,995,807, "Method of switching a channel from a first propagation path to a second propagation path," issued to Magnier, et al. on Nov. 30, 1999, describes a satellite telecommunications network for mobile stations. The network operates in a "switched diversity" mode in which a call set up between a first station, e.g., a base station, and a second station, e.g., a mobile terminal, can be transmitted over either one of two propagation paths, i.e., via one of two distinct satellites based on the measurement of a value representative of signal-to-noise ratio for each of said propagation paths, namely the current path and a next path.

U.S. Pat. No. 5,970,050, "Allocating communication traffic," issued to Johnson on Oct. 19, 1999, describes a method for selecting one of a number of possible routes through a communications network from a first node to a second node. The method includes defining a relationship between a range of costs for routes and a traffic density for routes. The relationship is represented by a curve with at least one point of inflection. The method monitors and uses traffic density for each of the possible routes to establish the cost of each the possible route in accordance with the relationship. One of the possible routes is selected in dependence on the cost of each possible route as established by said relationship.

U.S. Pat. No. 5,828,655, "Hybrid access system with quality-based channel switching," issued to Moura, et al. on Oct. 27, 1998, describes an asymmetric network communication system for use in a client-server environment having independent forward and return channels operating at different speeds and/or under different protocols on the same or different communication media to provide efficient utilization of shared resources. A network manager, such as a hybrid access system, effects transmission of packetized data on a forward (downstream) channel from a host server to multiple client devices coupled with a shared downstream media while simultaneously providing selectable multiple lower speeds of operation on shared or dedicated return (upstream) channels from the client devices to the host server depending on bandwidth availability, bandwidth demand, service level authorization, etc. for the return channel. Forward and return channels may be located on the same or different communication medium including a CATV network, direct broadcast satellite network, television or radio RF broadcast network, wireless or mobile cellular facilities or the like. The return channel may reside on a PSTN either directly coupled with the host server or connected with the network manager for subsequent transmission to the host server. The network manager handles or controls the forward and return communication to establish interactive full-duplex real-time network sessions between the host and a selected client device. The network manager switches upstream channel assignment based on quality of signals transmitted to the host. The system effects changes in the upstream transmitted power based on sensed conditions.

In U.S. patent application Ser. No. 09/862,899, "Method and system for assigning circuits to a new service request in a communications network," filed on May 22, 2001 by Sahinoglu and Porikli, a method for admission decision of application service request to a network is described. It does not involve channel management after a service request is granted and placed on an available channel.

In general, the primary drawback of using the prior art methods is that other networks and other paths may, at a later time, better satisfy the objective function after the network and path have initially been selected. In that case, the selected path is no longer the optimal path. Based on prior art methods, there is no way to exploite the availability of multiple networks in an optimal way.

Many elements are known for building an infrastructure to generate, transmit and receive multimedia content over networks, such as the one shown in FIG. 1. For example, standards such as MPEG-2 and MPEG-4 play an important role in the efficient broadcast and distribution of audio and video content, see ISO/IEC 13818:1995, "Information Technology—Generic Coding of Moving Pictures and Associated Audio," and ISO/IEC 14496:1999, "Information Technology—Coding of Audio-Visual Objects," respectively. For transport over IP networks, there exist a variety of specifications defined by the IETF, see for example, "RTP: A Transport Protocol for Real Time Applications," RFC 1889, January 1996 by Schulzrinne, et al., and "RTP Payload Format for MPEG-4 Audio/Visual Streams," RFC 3016, November 2000 by Kikuchi, et al. Furthermore, for the search and retrieval of multimedia contents, MPEG-7 provides a standardized set of descriptors and descriptions schemes, see ISO/IEC 15938:2001, "Information Technology—Multimedia Content Description Interface."

However, currently there is no standard that describes how these elements, either in existence or under development, relate to each other. The primary aim of the emerging MPEG-21 standard, officially referred to as ISO/IEC 21000, "Information Technology—Multimedia Framework," is to describe how these relate to each other. It is expected that the various specifications that exist, or will be developed, will be integrated into a multimedia framework through collaboration between MPEG and other standardization bodies. The overall vision for MPEG-21 is to define a multimedia framework to enable transparent and augmented use of multimedia resources across a wide range of networks and devices.

Within the MPEG-21 framework, the fundamental unit of transaction is referred to as a "digital item." A digital item is defined as a structured digital object with a standard representation and identification. The digital item includes resources (content) and associated descriptors The resources can include individual multimedia assets, such as MPEG videos, MP3 audio files. The descriptors include descriptive information about the internals of the resources, such as content identification and content-based descriptors, e.g., an MPEG-7 description. The proposed framework currently does not consider external descriptions, such as network condition, terminal characteristics, and user preferences.

MPEG-21 has recently developed a Digital Item Declaration (DID), Part 2 of ISO/IEC 21000, which is scheduled to become an international standard in May 2002. The purpose of the DID is to declare the make-up and structure of a digital item. An XML-based Digital Item Language Declaration (DIDL) has been developed. The DIDL is a generic structure to provide hierarchical and flexible metadata expression, as well as re-usable and configurable elements. To enable an interoperable framework and support various applications, it is important that these descriptors be specified in a standardized way.

It is desired to provide descriptors that can also be used for optimal network and path selection. Furthermore, it is desired that the selection can change dynamically while terminals actively transmit and receive resources within any available network.

SUMMARY OF THE INVENTION

A method and system connects a first terminal via multiple networks to a second terminal. An environment description is acquired and parsed by a description parser into cost parameters using a set of rules. An objective function evaluates the cost parameters to determine an optimal path to connect the first terminal to the second terminal through the multiple networks using a switch. The selection of the optimal path can be done periodically during a particular application session.

DETAILED DESCRIPTION OF PREFERRED EMBODIMENTS

Introduction

The present invention describes a system and method for dynamically selecting an optimal communication path in multiple networks. Each network may have different capacity and available bandwidth at the time of a service request. Furthermore, each network is defined by time-variant and time-independent cost parameters.

Multiple Networks

Figure 2:
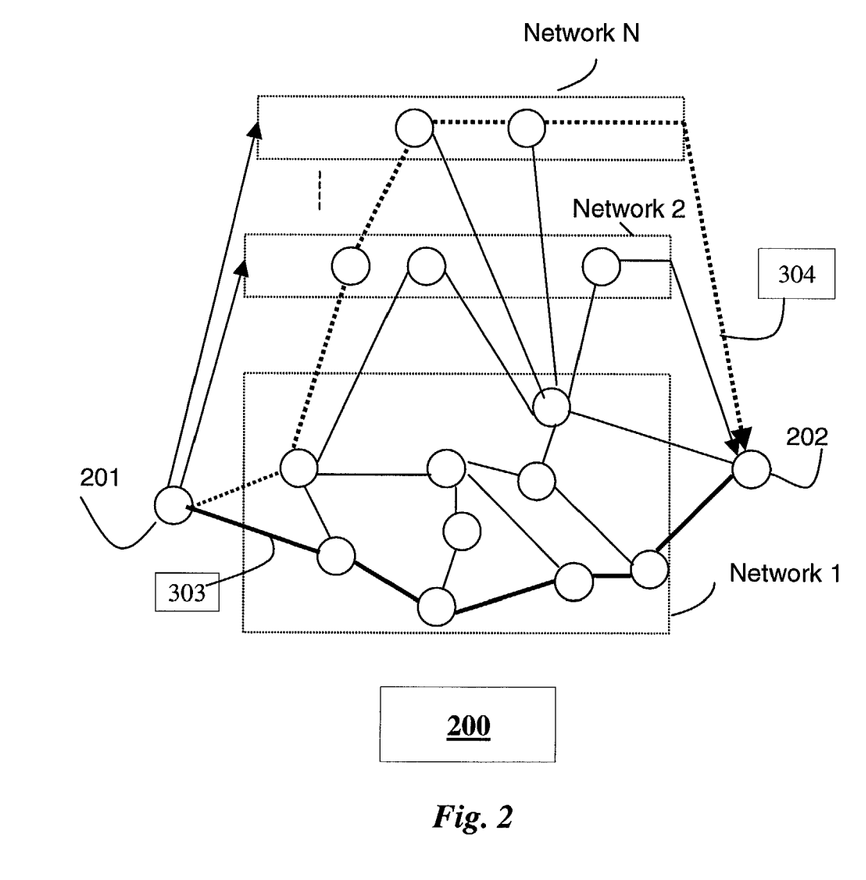
FIG. 2 is a diagram of multiple networks with dynamic path selection according to the invention.

FIG. 2 shows multiple networks (Networks 1, 2, ..., N) 200 with dynamic optimal path selection according to the invention. The optimal path connects terminals 201–202. The invention models optimal path selection with a slotted time approach, as described in greater detail below. A time slot can be independent, or dependent on traffic characteristics, or based on a temporal cost changes in all available networks. In a video application, for example, a time slot can be the duration of a single video frame, or a group of pictures (GOP).

The bold path 303 indicates the optimal path initially selected at the time the connection is established. The dashed path 304 indicates the optimal path dynamically selected at some later time. In contrast with the prior art, some optimal paths can include links that pass through multiple networks.

System Structure

Figure 3:
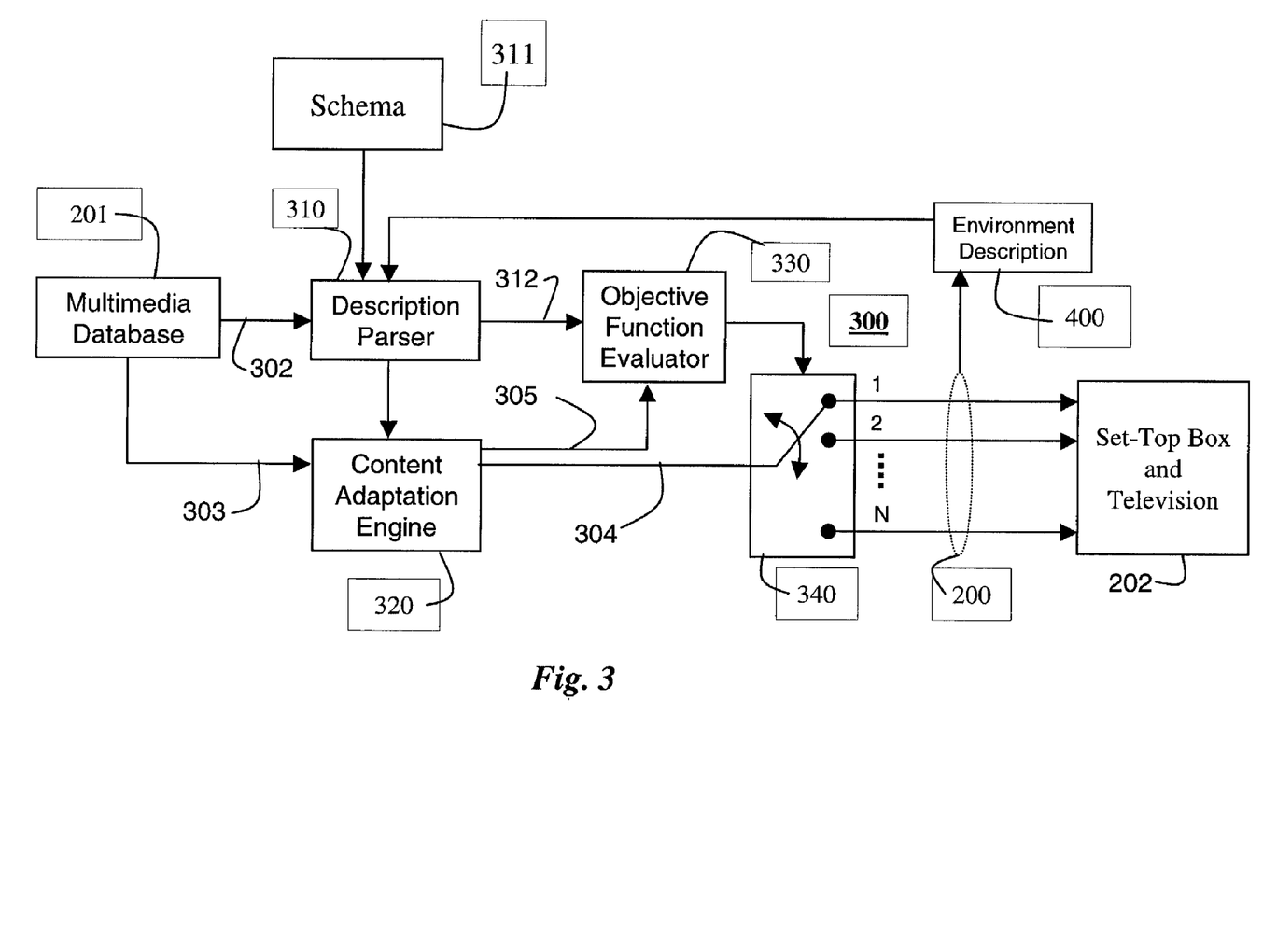
FIG. 3 is a flow diagram of a system and method for dynamic path selection with multiple networks according to the invention.

FIG. 3 shows a system and method 300 for performing dynamic optimal path selection according to the invention. The system 300 includes the multiple (N) network 200 of FIG. 2 connecting the terminal 201, e.g., a content server storing a multimedia database, to the terminal 202, e.g., a client device, such as a television connected to the network via a set-top box.

The system 300 also includes a description parser 310, a content adaptation engine 320, an objective function evaluator 330, and a switch 340.

System Operation

Figure 4:
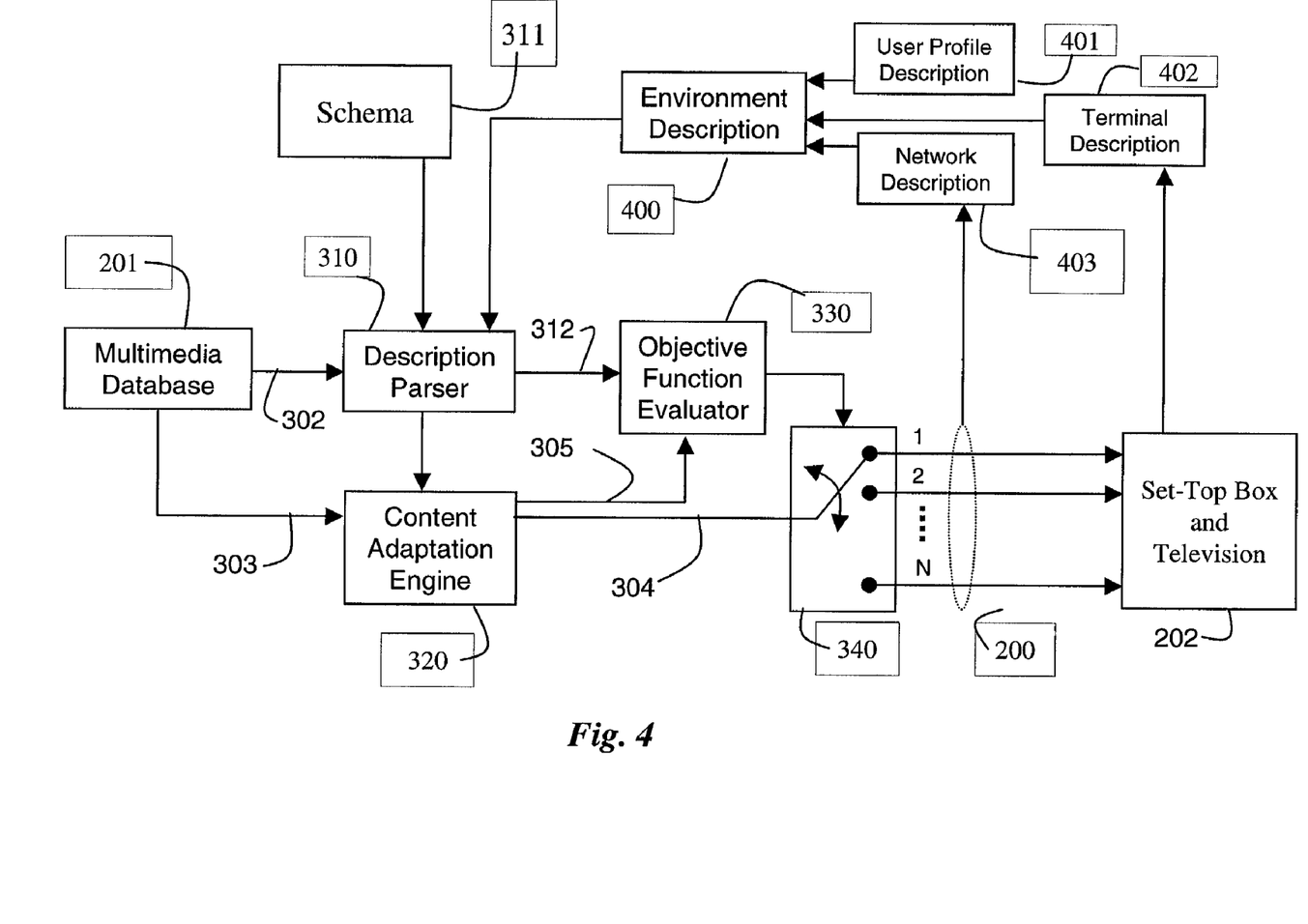
FIG. 4 is flow diagram of a system and method for dynamic path selection based on environment descriptions.

During operation of the system 300 for a particular application, e.g., video-on-demand (VOD), the description parser 310 periodically acquires an environment description 400, for example, the operating characteristics of the multiple networks 200. The environment description 400 is described in further detail below. Methods for acquiring characteristics that describe the operation of the networks' environment, such as cost, bandwidth, utilization, and capacity, are well known.

The description 400 is parsed 310 according to a schema or a set of rules 311. The rules define the grammar to be used to parse the environment description, and any other descriptions to be parsed. The parsed environment description 312, for example, cost parameters that describe the network characteristics, is passed forward to the objective function evaluator 330. The evaluator minimizes an objective function using the parsed cost parameters in order to periodically select an optimal path, as described in greater detail below.

The content server 201 provides the description parser 310 with a content description 302, e.g., an MPEG-7 resource description of a digital item, as described above. The content description is also parsed 310 using the schema 311. It should be understood that the schema can include a separate set of rules for each different description to be parsed. The content adapter 320 receives content 303, and also the parsed environment description and the parsed content description 302.

The content adaptation engine 320 can adapt the content 303 according to the content and environment description. In some cases, the content adaptation can be a null operation. The adapted content 304 is passed to the switch 340. Adapting the content will require some bandwidth 305, which is passed to the evaluator 330 for consideration during the evaluation.

Using the bandwidth 305 and the parsed environment description 312, the objective function evaluator 330 selects the optimal network and path within any of the networks 200, using the switch 340, to transfer the adapted content 304 to the terminal 202, for a specified time period. This process is repeated periodically, e.g., each frame or GOP, using updated descriptions to dynamically select the optimal path over time.

FIG. 4 shows the more general case for the above system 300. Here, the environment description 400 includes a network description 403 as described above, or combinations of any number of descriptions, for example, a user profile description 401, and a terminal description 402. In the general case, the combined environment description 400 is used by the parser 310, engine 320, and evaluator 330.

Network Description

Each of the N networks 200 is defined by certain descriptors 403. The operating condition of each network is described by delay characteristics, such as end-to-end delay, delay variation, error characteristics, such as bit error rate, packet loss rate, and bandwidth characteristics, such as link capacity, available bandwidth, utilized bandwidth, etc. The cost descriptions can be classified according to two distinct costs: an application quality of service cost (QoS), and a connection cost. For instance, an application with a low connection cost may also suffer from low QoS. On the other hand, an application with a high quality of service may require connecting to a high cost network.

Figure 5:
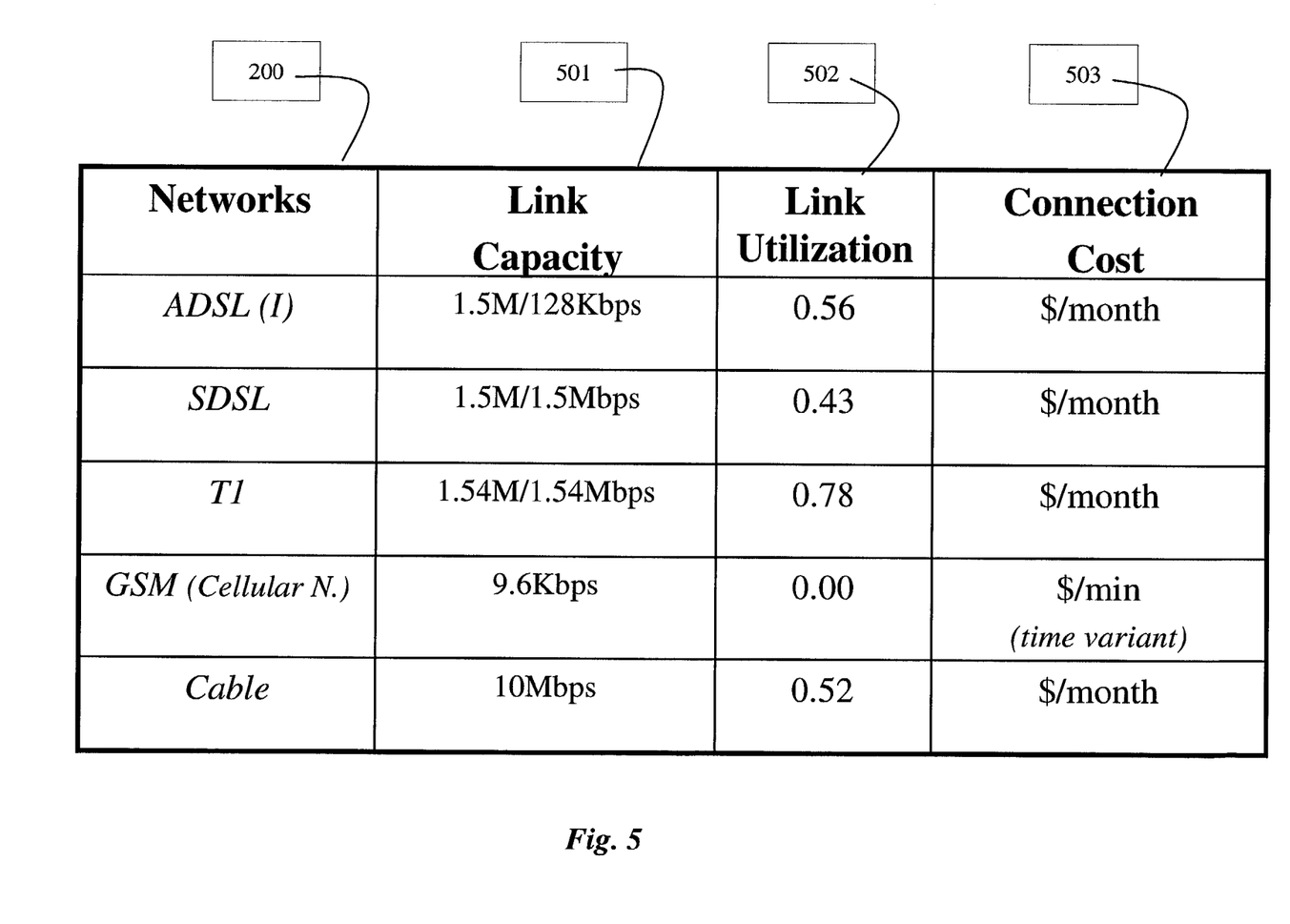
FIG. 5 is a table of multiple networks and multiple selection objectives.

FIG. 5 shows a sample presentation of multiple networks 200 and cost parameters that make up the environment descriptions. The content server 201 can communicate with the terminal 202 over more than one network, each of which can have a different capacity 501, utilization level 502, usage cost, 503. Other network conditions and cost parameters, such as, delay and error characteristics can also be described. All of these can be evaluated during the selection of the optimal path. In addition, these cost parameters typically vary over time.

It is a responsibility of the server 201 to select and maintain the optimal path with the service-requesting remote terminal 202. In order to maintain an optimal path with given QoS constraints, the system 300 as described above, has the capability to switch paths from one network to another, or to other paths within a given network. Hereinafter, a different path includes a least one different link in the same network, or a different network.

Figure 6:
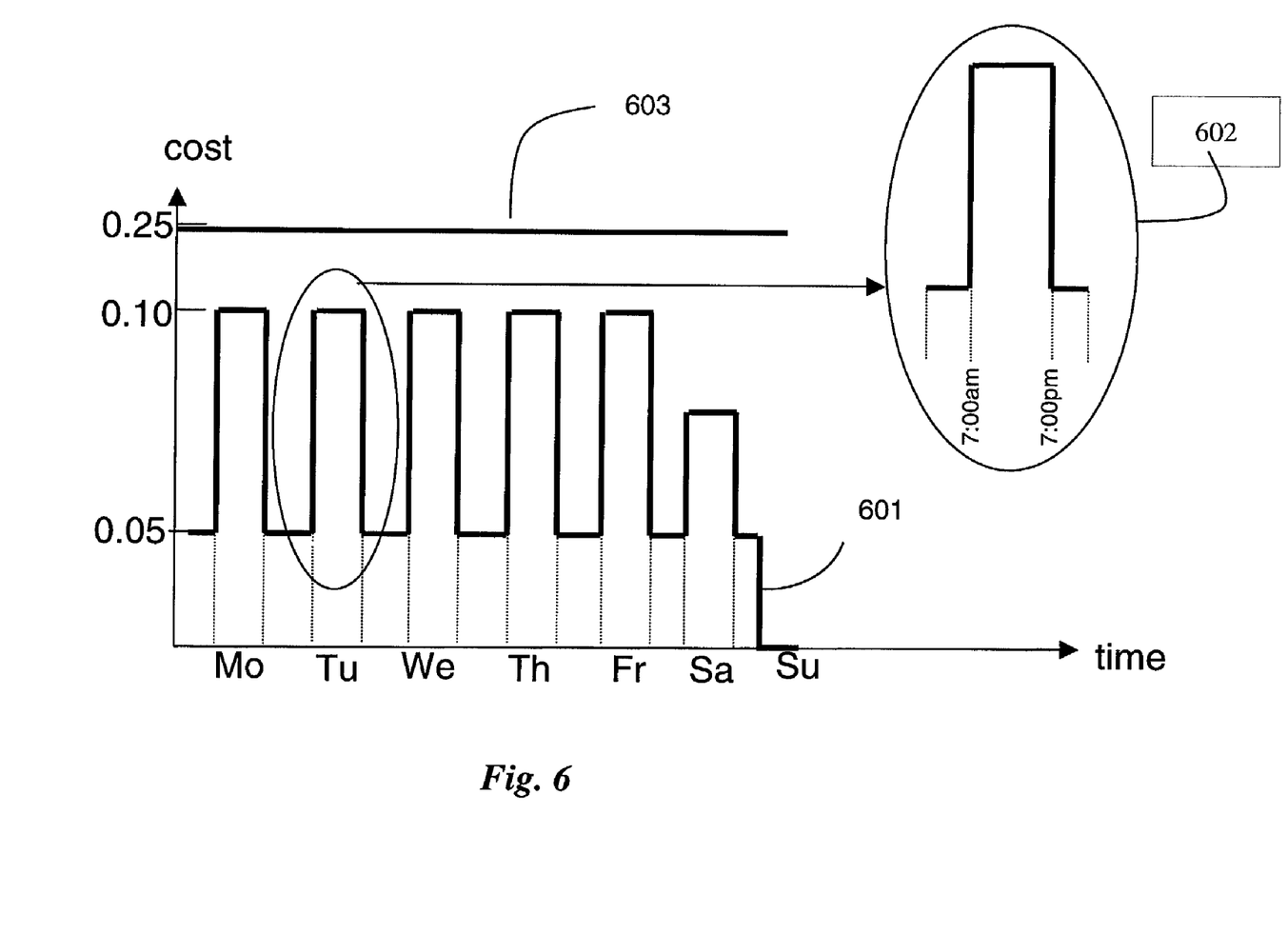
FIG. 6 is timing diagram of cost as a function of time in a wireless network.

FIG. 6 shows path cost as a function of time for an example wireless network. For local services, the cost 601 is high in the day time between 7 a.m. and 7 p.m., and low at night between 7 p.m. and 7 a.m., as shown in inset 602. For long distance services, the cost 603 is constant over time. In addition, the costs can change at any time in response to changing operating and competitive conditions of the networks. This can change the server's decision on what network to use for a particular application during an on-going session while service is provided. The server may switch the session or the service to another access network at any time in order to reduce costs. The invention as describes herein enables this dynamic selection of the optimal connection path during a session.

Figure 7A:
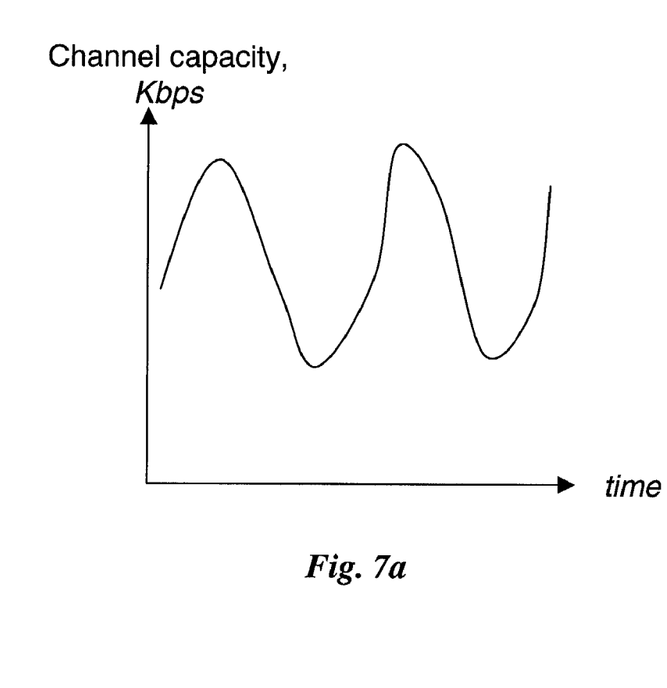
FIG. 7a is a graph of channel capacity as a function of time.
Figure 7B:
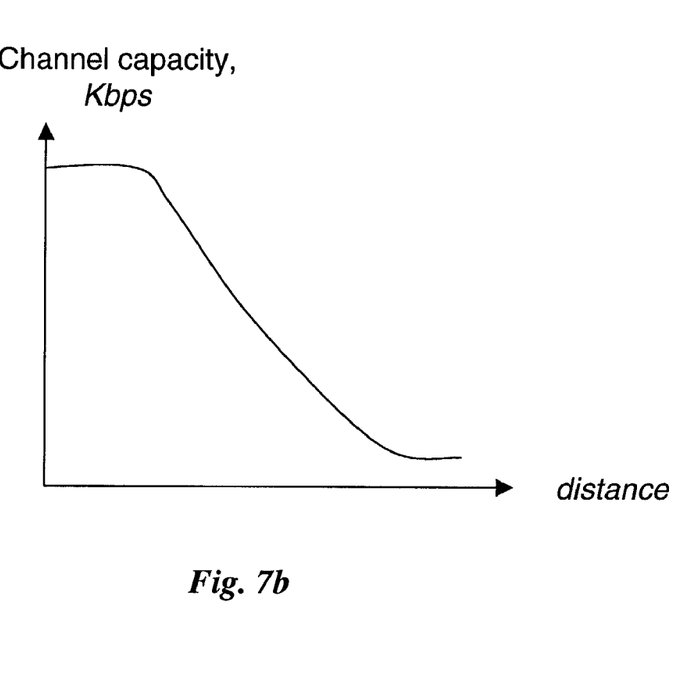
FIG. 7b is a graph of channel capacity as a function of network distance.

FIG. 7a shows channel capacity as a function of time, and FIG. 7b shows the channel capacity as a function of distance. Time and distance variant capacity can drastically effect the available bandwidth for a particular service. For example, a decrease in the bandwidth may degrade the performance of the service, and therefore, the service provider may want to switch to a better path, or another network.

Figure 8:
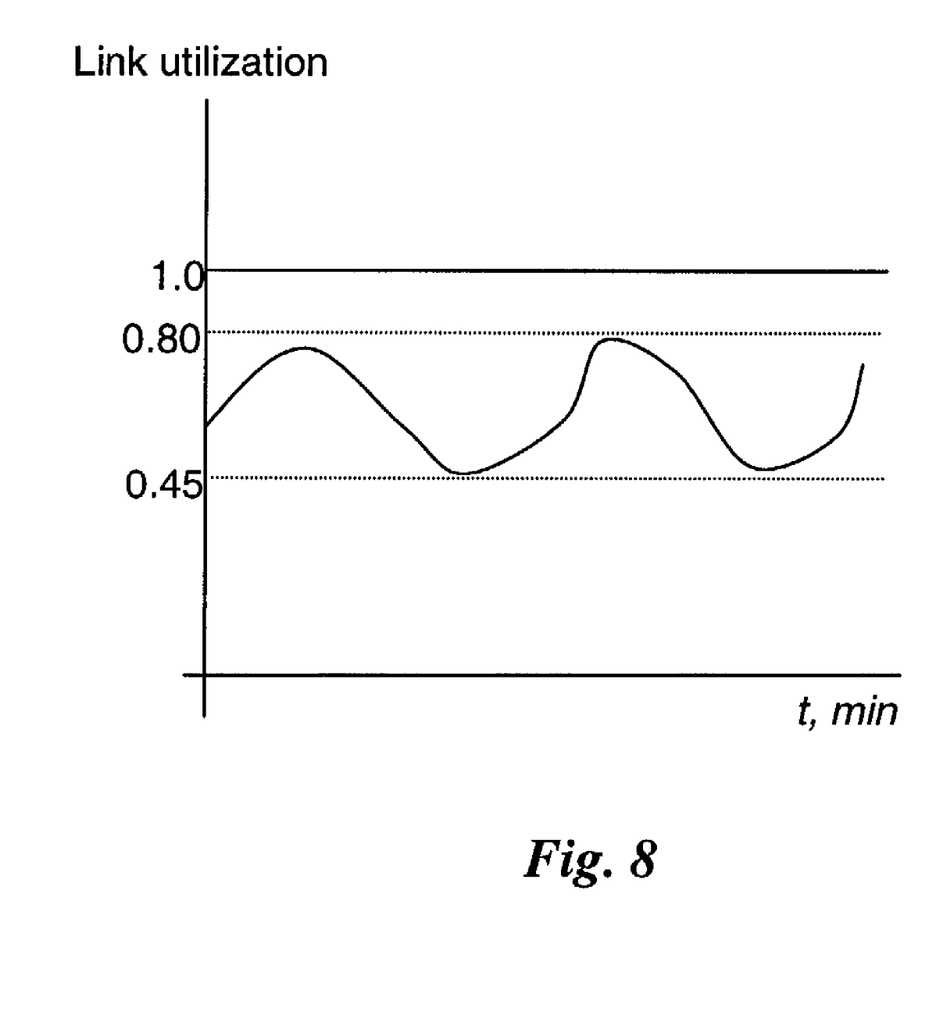
FIG. 8 is a graph of link utilization as a function of time.

FIG. 8 shows link utilization as a function of time. Each link in any of the networks 200 can have its own optimum link utilization threshold, e.g., less than 0.8. Admission of an application to be serviced over a link with an already high utilization can increase to the point of driving the link to saturation. If saturation occurs, then the QoS of all the applications on the same link degrades.

Environment Descriptions

In addition to network descriptions 403, there are a variety of other external or environmental factors that affect the operation of the system 300. These factors can be specified in terminal descriptions, delivery descriptions, user preference descriptions, and natural environment descriptions. All of these factors can be cost parameters of the environment description 400.

The terminal descriptions can specify terminal capabilities include hardware properties, such as processor speed and memory capacity, software properties, such as type of operating system, display properties, such as screen resolution, and device profile, which may indicate the media formats supported, e.g., MPEG profile/level.

The delivery descriptions specify the type of transport protocols supported, such as MPEG-2 Systems, TCP/IP and RTP, as well as the types of connections supported, e.g., broadcast, unicast, multicast.

User preferences include filtering and search preferences, browsing preferences, display preferences and QoS preferences, as well as demographic information, such as gender and age.

Natural environment characteristics include location, such as GPS coordinates and locale, the type of location, e.g., indoor, outdoor, home or office, the velocity of a mobile terminal, as well as the illumination properties of the terminal.

In addition to the above, the environment descriptions can also specify service descriptions. The service description can specify service capabilities include a particular user's role, e.g., content creator, service provider, rights owner, billing party or end consumer, as well as the type of service that particular user provides, such as content creation, rights negotiation, billing, content adaptation and transcoding, use of the network and content consumption. Assuming that a particular user is the right owner or content creator, the environment description can also include the permissible types of adaptations that are allowed, e.g., the bit-rate should not be less that 2 Mb/sec, or the spatial resolution of a video should not be reduced by more than a factor of two.

Content Adaptation Engine

The operation of the content adaptation engine 320 is affected not only by environment description 400, but also the content description 302. Such descriptions include transcoding hints as specified in U.S. patent application Ser. No. 09/547,159, "Video transcoding using syntactic and semantic clues," filed on Jun. 15, 1999, by Vetro et al., or ISO/IEC 15938-5:2001, "Information Technology—Multimedia Content Description Interface: Part 5 Multimedia Description Schemes."

There are a wide variety of resource adaptation engines that can be used with the present invention. For video transcoding, the resource adaptation engine may consider bit rate reduction, see for example "Architectures for MPEG compressed bitstream scaling," IEEE Transactions on Circuits and Systems for Video Technology, April 1996 by Sun et al., and spatial resolution reduction, see for example, U.S. patent application Ser. No. 09/853,394, "Video Transcoder with Spatial Resolution Reduction," filed on May 11, 2001 by Vetro et al. Other types of adaptation may include a generation of video summaries, see for example U.S. patent application Ser. No. 09/845,009, "Method for summarizing a video using motion and color descriptors," filed on Aug. 9, 2000 by Divakaran, et al., or changing the compression format, e.g., from MPEG-2 to MPEG-4.

In U.S. patent application Ser. No. 09/496,706, "Adaptable Compressed Bitstream Transcoder," filed on Feb. 2, 2000 by Vetro et al., incorporated herein by reference, a transcoder operates in any one of a plurality of conversion modes. A manager is configured to select a particular mode depending on semantic content of the bitstream and network characteristics. The system also includes a content classifier to determine the content characteristics, and a model predictor to determine the network characteristics, and input is received on the user device characteristics. An integrator of the manager generates optimal rate-quality functions to be used for selecting the particular conversion model for the available bit-rate of the network.

This invention can use any known methods for resource adaptation. The specific abilities of the content adaptation engine that are embedded into a particular device depend highly on the target application and target adaptation device.

Objective Function Evaluator

The optimum link switching criteria differs for two cases. In the first case, see equation (1) and FIG. 9, there is a priori knowledge of traffic and channel characteristics. In the second case, see equation (5) and FIG. 10, there is no a priori knowledge of traffic and channel characteristics, and these need to be predicted. Any conventional method in the literature, as well as new methods, can be used to predict traffic and channel characteristics.

Evaluating with Known Traffic and Channel Characteristics

For a playback application, for example, servicing a video-on-demand (VOD) request, traffic characteristics are known a priori. Therefore, throughout the duration of the playback, traffic bit rates and frame arrival rates for each time slot, and temporal bandwidth demand of the application can be predetermined. If the path's cost parameters are also known, then it is possible to determine the minimum-cost switching pattern before the optimal is selected and the application request is serviced. This minimum-cost switching pattern is determined by equation (1), and the application is switched according to this already determined pattern. In this first case, it is possible that only a single decision is made during the entire run-time of the application.

Figure 9:
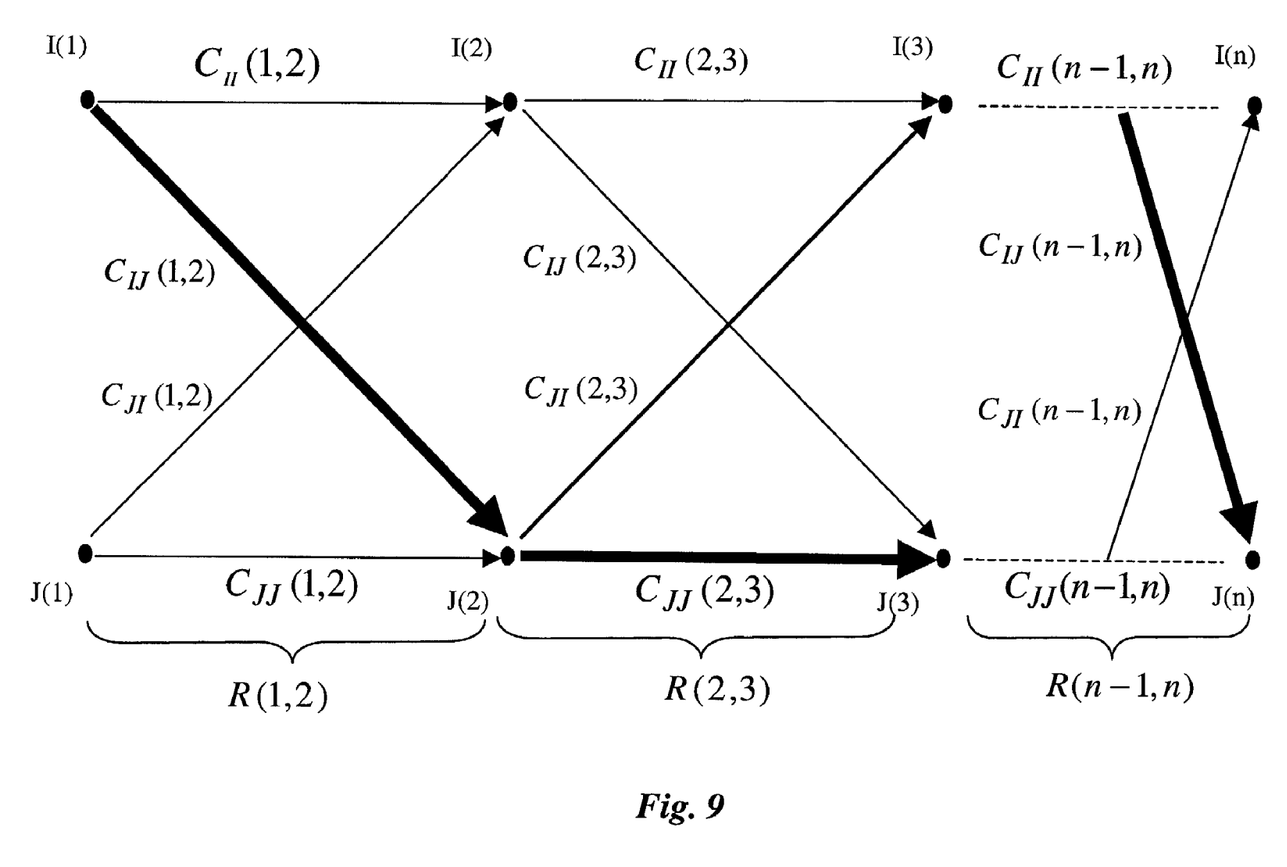
FIG. 9 is a lattice modeling an optimal switching method for multiple paths with a priori knowledge of traffic and channel characteristics.

FIG. 9 models the selection of multiple possible paths, e.g., two paths i and j where traffic and channel characteristics are known a priori. This model can be evaluated as a Viterbi lattice with branches, as described in greater detail below. The paths can be in the same network, or in multiple networks with quite different transmission media between a source terminal and a destination terminal. The links of the paths are defined with associated time-variant and time-invariant objective functions. The dynamic optimal path selection according to the invention is modeled with a slotted time approach. A variable m is used to index time slots, and a variable n is the maximum number of time slots used for a particular periodic evaluation.

The parameters in FIGS. 9 and 10, and equations 1 and 5 are defined as follows:

$C_{ij}(n_1, n_1+1)$: Cost of switching an application on a path i starting with a time slot $m=n_1$ to a path j for a time slot $m=n_1+1$ when $i \neq j$;

$C_{ij}(n_1, n_1+1)$: Cost of keeping an application on path i starting from time slot $m=n_1$ to a path j for a time slot $m=n_1+1$ when $i=j$;

$I(n_1)$: Aggregate cost of path i during time slot $m=n_1$;

$J(n_1)$: Aggregate cost of path j during time slot $m=n_1$;

$R(n_1, n_1+1)$: Cost of meeting the QoS requirements of applications traffic between time slots $n_1$ and $n_1+1$. This is a function of delay and bandwidth constraints, and other network characteristics; and $\hat{\cdot}$: predicted values, see equation (5) and FIG. 10 below.

Assuming that a service for an application is first assigned to path i, the goal is to find a solution that minimizes an objective function $$\min \sum_{\substack{m=1 \\ \forall i,j}}^{n-1} (C_{ij}(m, m+1) - R(m, m+1))^2 \qquad (1)$$

throughout the lifetime of the session. Because the system model is expressed as a lattice with multiple branches, a Viterbi decoder can be used to find the optimal solution.

If $R(n_1, n_1+1)$ is greater than $C_{ij}(n_1, n_1+1)$, then that branch is not considered for time interval $(n_1, n_1+1)$, and is excluded from the above objection function.

The costs $I(n_1)$ and $J(n_1)$ at time slot $m=n_1$ are determined as follows:

$$I(n_1) = \min(I(n_1-1) + (C_{ii}(n_1-1, n_1) - (R(n_1-1, n_1))^2, \\ J(n_1-1) + C_{ji}(n_1-1, n_1) - (R(n_1-1, n_1))^2) \qquad \text{Equation (2):}$$

$$J(n_1) = \min(I(n_1-1) + C_{ij}(n_1-1, n_1) - (R(n_1-1, n_1))^2, \\ J(n_1-1) + C_{jj}(n_1-1, n_1) - (R(n_1-1, n_1))^2) \qquad \text{Equation (3):}$$

Keeping an application or a session on the same path from time slot n to a next time slot $(n_1+1)$ can be expressed as $I(n_1) \rightarrow I(n_1+1) \| J(n_1) \rightarrow J(n_1+1)$. In such a case, the cost of switching is zero.

However, staying on the same path may induce other costs, e.g., as shown in FIG. 6, some connections are free after 7:00 p.m. Therefore, the cost parameter $C_{ii}(n_1, n_1+1)$ is specifically expressed with two components: first, a time dependent link cost parameter $f_{ii}(n_1, n_1+1)$, and second a traffic dependent QoS cost parameter $g_{ii}(r_{n1}, u_{n1}, b_{n1})$, where $r_{n1}$ is the applications bandwidth demand, $u_{n1}$ link utilization, $b_{n1}$ introduced delay at time slot $n_1$:

$$C_{ii}(n_1+1) = \alpha f_{ii}(n_1, n_1+1) + \beta g_{ii}(r_{n1}, u_{n1}, b_{n1}) \qquad (4)$$

where α and β are cost weight functions for f(.) and g(.).

Evaluating with Predicted Traffic and Channel Characteristics

Figure 10:
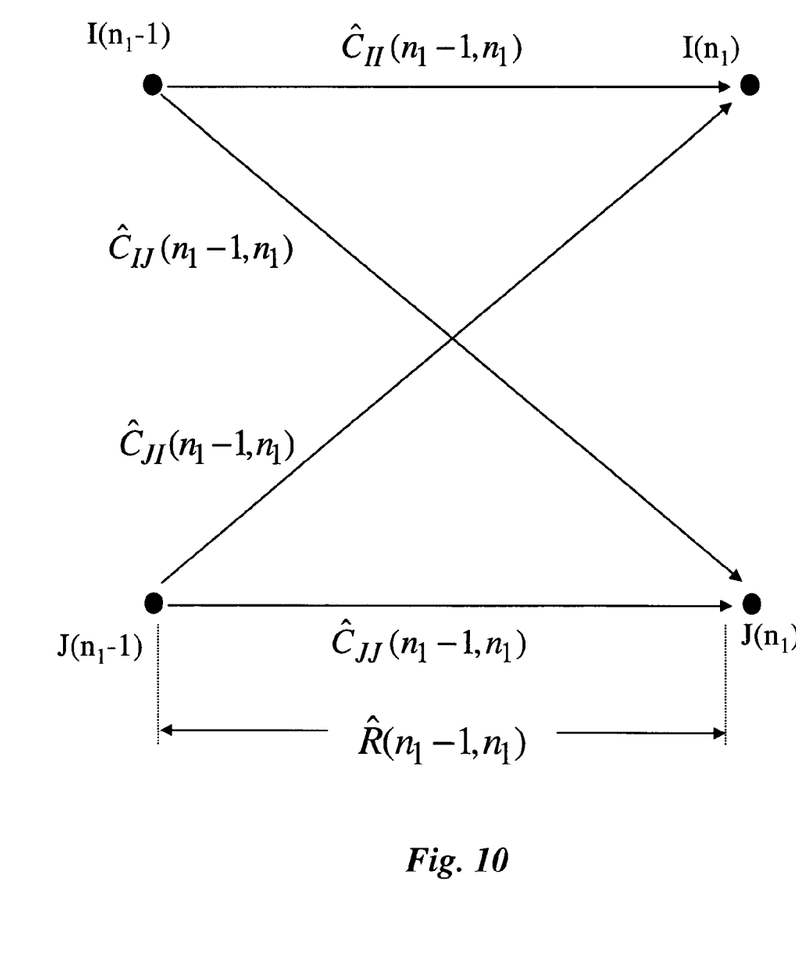
FIG. 10 is a lattice modeling an optimal switching method for multiple paths without a priori knowledge of traffic and channel characteristics.

With no a priori knowledge of traffic and channel characteristics, the predicted values of the cost parameters for a next time slot have to be used as shown in FIG. 10, and the decision is made in favor of the switching direction which minimizes the objection function of equation (5) for each time slot.

$$\min \sum_{\substack{m=n1-1 \\ \forall i,j}}^{n1} (\hat{C}_{ij}(m, m+1) - \hat{R}(m, m+1))^2, \forall n1, 0 < n_1 < n. \qquad (5)$$

In this second case, at least as many decision as the number of time slots for each "butterfly" are made as shown in FIG. 10.

Server Functionality

In order to dynamically select and maintain the optimal path, the following factors can be considered to make path selections: the number of networks that can connect a source and destination terminals, the client terminal capabilities, e.g., hardware properties (processor speed, memory architecture etc.), device type (encoder, decoder, gateway, router, camera etc.), display type and characteristics, measuring the utilization of each link as the ratio of a traffic rate to the link capacity, and processing user QoS preferences as an input for access network selection decision.

The ability to measure and know delay characteristics of each path (end-to-end delay, delay variation, etc.), error characteristics (bit error rate, packet loss, burstiness, self-similarity level of aggregate background traffic etc.), bandwidth characteristics (link capacities, bandwidth variation etc.) can be used by the content server can adapt the resolution of a video sequence, and convert the stream to another format. These resolution and format changes directly affect the selection of the network to deliver the content.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for connecting a first terminal via a plurality of networks to a second terminal, comprising:
   acquiring an environment description;
   parsing the environment description into cost parameters using a set of rules;
   modeling an objective function as a lattice;
   evaluating the objective function using the cost parameters and a Viterbi decoder to solve for a minimum cost; and
   selecting an optimal path through the plurality of networks based on a minimum cost to connect the first terminal to the second terminal.

2. The method of claim 1 wherein the environment description includes a network description for each of the networks.

3. The method of claim 2 wherein each of the networks includes a plurality of links, and each network description includes connection cost, bandwidth, utilization, and capacity of each link.

4. The method of claim 2 wherein each network description includes end-to-end delay, delay variation, error characteristics, and packet loss rate for each network.

5. The method of claim 4 wherein the objective function is:

$$\min_{\substack{m=1 \\ \forall i,j}}^{n-1} (C_{ij}(m, m+1) - R(m, m+1))^2,$$

where i and j are paths through the plurality of networks, C is a cost of selecting a different optimal path for a time interval including a maximum of n time slots, each time slot of length m, and R is a cost of meeting quality of service requirements.

6. The method of claim 1 wherein the environment description includes a terminal description for each terminal.

7. The method of claim 6 wherein each terminal description includes hardware and software descriptions for each terminal.

8. The method of claim 1 wherein the environment description includes a delivery description.

9. The method of claim 8 wherein the delivery description specifies transport protocols.

10. The method of claim 1 wherein the environment description includes a user preference description.

11. The method of claim 10 wherein the user preference description includes filtering, search, browsing, and display preferences.

12. The method of claim 10 wherein the user preference description includes user demographic information.

13. The method of claim 1 wherein the environment description includes a natural environment description.

14. The method of claim 13 wherein the natural environment description specifies a location and a type of location of each terminal.

15. The method of claim 1 wherein the environment description includes a service description.

16. The method of claim 15 wherein the service description specifies service capabilities.

17. The method of claim 1 wherein the acquiring, parsing, evaluating, and selecting is performed periodically to dynamically select the optimal path for a particular time interval.

18. The method of claim 1 wherein the optimal path passes through a subset of the plurality of networks.

19. The method of claim 1 wherein the evaluating considers content bandwidth requirements.

20. The method of claim 1 further comprising:
   acquiring a content description of content;
   parsing the content description into cost parameters of the content; and
   evaluating the objective function using the cost parameters of the content;
   adapting the content according to the parsed content description and the parsed environment description to form adapted content; and
   delivering the adapted content over the selected optimal path.

21. The method of claim 1 wherein the cost parameters are known.

22. The method of claim 1 wherein the cost parameters are predicted.

23. The method of claim 1 wherein the cost parameters include a time dependent path cost parameter, and a traffic dependent quality of service parameter.

24. The method of claim 1 wherein the networks have different capacity and different available bandwidth.

25. The method of claim 1 wherein each network is defined by time-variant and time-independent cost parameters.

26. The method of claim 1 wherein the first terminal is a content server configured to transmit a video and the second terminal is a client terminal configured to receive the video.

27. A system for connecting a first terminal via a plurality of networks to a second terminal, comprising:
   an environment parser periodically acquiring and parsing an environment description of the plurality of networks into cost parameters;
   means for modeling an objective function as a lattice;
   an evaluator evaluating the objective function to determine a minimum cost using the cost parameters and a Viterbi decoder;
   means for selecting an optimum path through the plurality of networks based on the minimum cost; and
   a switch connecting the first terminal to the second terminal via the optimal path for a predetermined time period.

28. A method for connecting a first terminal via a plurality of networks to a second terminal, comprising:
   acquiring an environment description;
   parsing the environment description into cost parameters using a set of rules;
   evaluating an objective function using the cost parameters;
   selecting an optimal path through the plurality of networks based on a minimum cost to connect the first terminal to the second terminal;
   acquiring a content description of content;
   parsing the content description into cost parameters of the content; and
   evaluating the objective function using the cost parameters of the content;
   adapting the content according to the parsed content description and the parsed environment description to form adapted content; and
   delivering the adapted content over the selected optimal path.

* * * * *